US012650558B2

(12) United States Patent　　(10) Patent No.:　US 12,650,558 B2
Wu et al.　　　　　　　　　　　　(45) Date of Patent:　　Jun. 9, 2026

(54) OPTICAL FIBER CLADDING OPTICAL FILTER

(71) Applicant: Fuzhou Photop Optics Co., Ltd., Fuzhou (CN)

(72) Inventors: Li Wu, Fuzhou (CN); Bin Zheng, Fuzhou (CN); Zhongwei Yu, Fuzhou (CN); Zhong Cheng, Fuzhou (CN); Lei Lin, Fuzhou (CN)

(73) Assignee: Fuzhou Photop Optics Co., Ltd., Fujian Province (CN)

( * ) Notice: Subject to any disclaimer, the term of this patent is extended or adjusted under 35 U.S.C. 154(b) by 609 days.

(21) Appl. No.: 18/193,677

(22) Filed: Mar. 31, 2023

(65) Prior Publication Data

US 2024/0295700 A1　　Sep. 5, 2024

(30) Foreign Application Priority Data

Mar. 2, 2023　　(CN) .......................... 202310186591.5

(51) Int. Cl.
　G02B 6/293　　(2006.01)
　G02B 6/02　　(2006.01)
　H01S 3/067　　(2006.01)

(52) U.S. Cl.
　CPC ..... G02B 6/29334 (2013.01); G02B 6/02209 (2013.01); H01S 3/06708 (2013.01); H01S 3/0675 (2013.01)

(58) Field of Classification Search
　CPC ........... G02B 6/29334; G02B 6/02209; G02B 6/02095; G02B 6/02057; G02B 6/02123; G02B 6/036; H01S 3/06708; H01S 3/0675; H01S 3/10023; H01S 3/06733
　See application file for complete search history.

(56) References Cited

PUBLICATIONS

TY—CONF TI—In-fiber Polarization Control Using Nematic Liquid Crystal in Nano-Capillary Bragg Grating Array T2—2021 Conference on Lasers and Electro-Optics (CLEO) SP (Year: 2021).*
Li et al., "Study on cladding light strippers in high power fiber lasers", Laser Technology, 2017, pp. 798-802, vol. 41:6. English-language Abstract.
Liu et al., "500 W passively-cooled fiber cladding light stripper", High Power Laser and Particle Beams, 2021, pp. 1-6, vol. 33:2. English-language abstract.

(Continued)

*Primary Examiner* — Matthew Mikels
(74) *Attorney, Agent, or Firm* — The Webb Law Firm

(57)　　　　　ABSTRACT

An optical fiber cladding optical filter includes an elongated capillary tube including an inner surface positioned surrounding an elongated optical fiber proximate or adjacent an exterior surface of the optical fiber and an outer surface positioned spaced from the exterior surface of the optical fiber. A grating formed on the outer surface of the elongated capillary tube aids in suppressing evanescent laser light that exits the optical fiber transverse to a longitudinal axis of the optical fiber. The elongated optical fiber and surrounding elongated capillary tube can include one or more curves along a length thereof to aid in the removal of one or more higher order laser modes as evanescent laser light that exits the optical fiber. The one or more curves can be received in a container to prevent or avoid evanescent laser exiting the optical fiber from propagating into an ambient environment.

19 Claims, 2 Drawing Sheets

(56) References Cited

PUBLICATIONS

Wang et al., "Stripping of cladding light at different angles: theoretical and experimental studies", Chinese Optics, 2019, pp. 1124-1130, vol. 12:5. English-language abstract.

Xia et al., "Optimization of thermal performance of cladding power stripper in fiber laser", Acta Phys. Sin., 2020, pp. 1-6, vol. 69:1. English-language abstract.

Zhao et al., "Research progress of the cladding light strippers in fiber lasers", Laser & Infrared, 2015, pp. 749-752, vol. 45:7. English-language Abstract.

* cited by examiner

OPTICAL FIBER CLADDING OPTICAL FILTER

CROSS-REFERENCE TO RELATED APPLICATION

This application claims priority to Chinese Patent Application No. 202310186591.5 filed Mar. 2, 2023, the disclosure of which is hereby incorporated by reference in its entirety.

BACKGROUND

1. Field

This disclosure relates to an apparatus and method for suppressing unwanted laser light or evanescent light that escapes or exits the cladding or coating of an optical fiber.

2. Description of Related Art

Heretofore, optical fiber cladding optical filters, sometimes referred to as cladding power strippers, generally included an elongated heat sink made of, for example, a block of aluminum or copper that included, in the elongated heat sink, an elongated cylindrical hole, an elongated semiellipsoid hole, an elongated V-groove, or an elongated square-groove in which the optical fiber is received. The optical fiber in the hole or groove may be coated with one or more high refractive index adhesives disposed between the optical fiber and a wall of the hole or groove.

In an example, the optical fiber in the hole or groove may include a fiber core surrounded by an inner cladding made of, for example, a low refractive index polymer, and, optionally, an outer cladding or coating made of, for example, acrylate. The one or more high refractive index adhesives may be disposed in contact between the hole or groove and the inner cladding or, when present, the outer cladding.

In an example, where a single high refractive index adhesive is disposed in contact between the outer cladding of the fiber and a wall of the hole or groove, the refractive index of the single adhesive may be, for example, 1.68. In another example, where three high refractive index adhesives are disposed in contact between the inner cladding (after removal of the outer cladding) and the hole or groove, the optical fiber may be divided into three sections which are coated at intervals with the three adhesives having refractive indices of 1.44, 1.46 and 1.56, respectively. In yet another example, the inner cladding (or outer cladding, if present) may be acid etched, e.g., with HF acid, and the single high refractive index adhesive disposed in contact between the inner (or outer) cladding and a wall of the hole or groove may have a refractive index of, for example, 1.56.

In another example, the inner cladding (or outer cladding, if present) may be acid etched, e.g., with HF acid, in multiple, e.g., two, sections with uneven thickness. In an example, the first section may be, for example, 50 mm long and the etched cladding radius may be, for example, 0.156 mm, and the second section may be, for example, 45 mm long and the etched cladding radius may be, for example, 0.1 mm. The first and second sections may be connected by a 5 mm long intermediate section of the fiber cable where the cladding tapers towards the first and second sections. One or more high refractive index adhesives may be disposed in contact between the first section, the second section and the intermediate section.

A drawback of the foregoing optical fiber cladding optical filters is that the acid etching may damage the surface of the fiber core or it is difficult in use of the foregoing optical fiber cladding optical filters to suppresses, avoid, remove or eliminate the unwanted evanescent laser light that exits the cladding of the optical fiber.

SUMMARY

Disclosed herein are non-limiting embodiments or examples of cladding optical filters, each of which comprises an elongated capillary tube that may be several centimeters long and include a cylindrical bore or opening having an inner surface diameter that closely matches an exterior surface diameter of an elongated optical fiber disposed in the cylindrical bore or opening. In an example, the cladding optical filter in the form of an elongated capillary tube may be made from quartz.

In an example, the optical fiber may have a fiber core, a first, inner cladding surrounding the fiber core and, optionally, a second, outer cladding or coating surrounding the first, inner cladding. Where the optical fiber includes the optional second outer cladding or coating, the exterior surface of the optical fiber is the exterior surface of the second outer cladding or coating. Where the optical fiber includes only the first inner cladding or coating, but not the optional second outer cladding or coating, the exterior surface of the optical fiber is the exterior surface of the first inner cladding or coating.

Each example cladding optical filter includes a grating or grating pattern formed on the capillary tube. In an example, the grating or grating pattern may be formed on a least a portion, desirably all, of the outer surface of the capillary tube.

An adhesive may be disposed between the inner surface of the capillary tube and an exterior surface of the optical fiber disposed in the cylindrical bore or opening of the capillary tube. In an example, the refractive indices of the adhesive and the fiber core of the optical fiber may match or be the same.

In an example, the capillary tube may be formed from a plurality, e.g., two, of elongated partial, e.g., one-half, capillary tubes joined together to form the elongated capillary tube. The plurality of partial capillary tubes may be joined together by an adhesive. In an example, the adhesive used to join together the plurality of partial capillary tubes may be a different adhesive or, desirably, the same or adhesive that may be disposed between an exterior surface of the optical fiber and the inner surface of the cladding optical filter.

In an example, the elongated optical fiber and surrounding elongated capillary tube may include one or more curves along a length thereof. The one or more curves may be disposed in a container that may be made from aluminum.

Also disclosed herein is an optical fiber cladding optical filter comprising an elongated optical fiber and an elongated capillary tube including an inner surface that is positioned surrounding the optical fiber proximate or adjacent an exterior surface of the optical fiber and an outer surface positioned spaced from the exterior surface of the optical fiber. A grating is formed on the elongated capillary tube.

Also disclosed herein is a method of optical fiber cladding optical filtering. The method includes: (a) providing an optical fiber cladding optical filter comprising an elongated optical fiber and an elongated capillary tube including an inner surface that is positioned surrounding the optical fiber proximate or adjacent an exterior surface of the optical fiber and an outer surface positioned spaced from the exterior surface of the optical fiber and a grating is formed on the elongated capillary tube; and (b) propagating light through the optical fiber, whereupon the grating suppresses light exiting the optical fiber transverse to a longitudinal axis of the optical fiber.

BRIEF DESCRIPTION OF THE DRAWING(S)

DESCRIPTION

Figures 1, 2A, 2B, 3A, 3B, 4A, 4B:
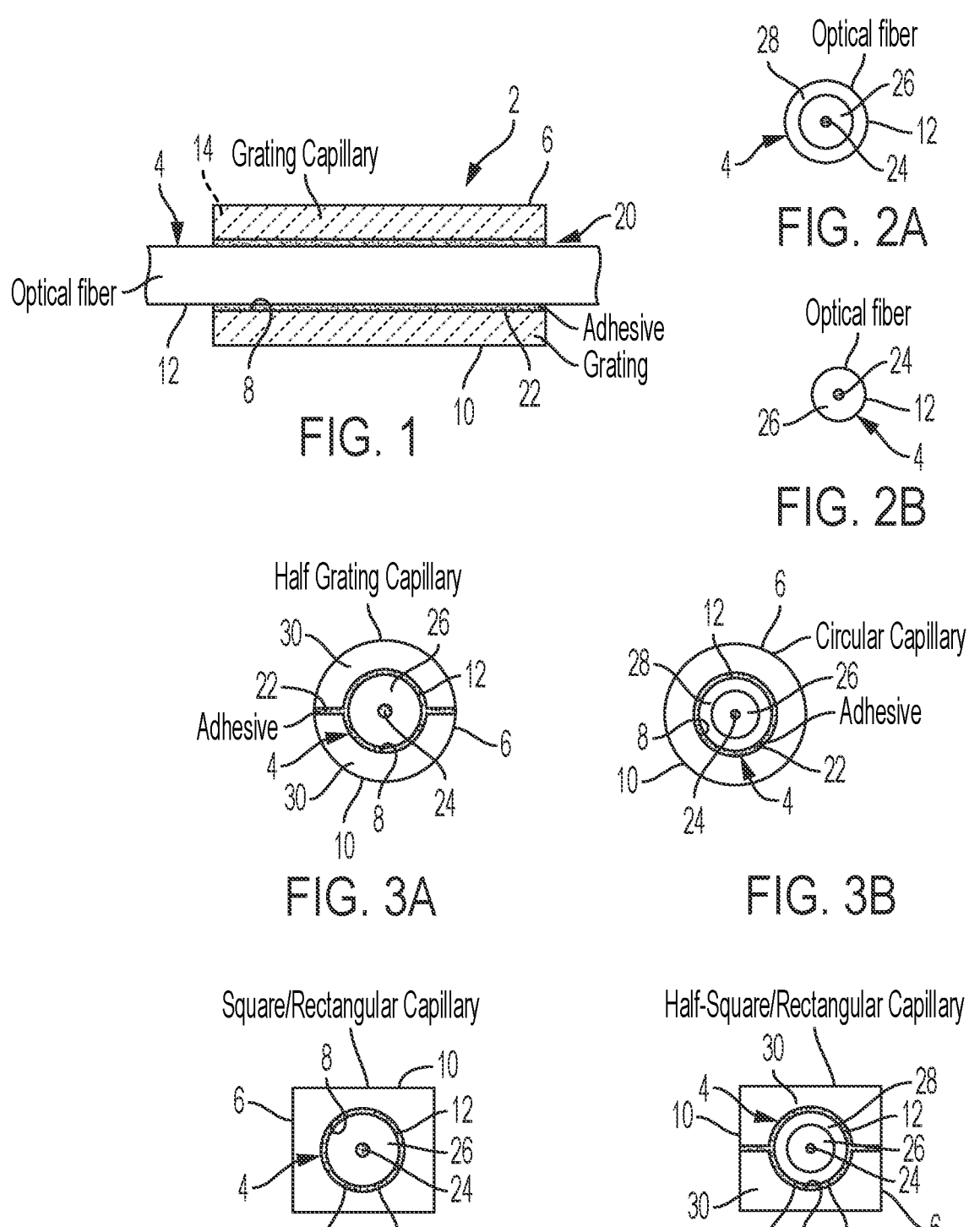
FIG. 1 is view of a length of an optical fiber including a section of a cladding optical filter in the form of capillary tube, including a grating pattern formed on an outer surface of the capillary tube and a cylindrical bore surrounding a portion of the length of the optical fiber.
FIGS. 2A and 2B are cross-sections of different example optical fibers that may be used with the cladding optical filter of FIG. 1.
FIG. 3A is an end view of a circular form of the cladding optical filter of FIG. 1, formed by joining together two elongated half-circular capillary tubes, including the cylindrical bore surrounding a cross-section of the optical fiber of FIG. 2B.
FIG. 3B is an end view of a circular form of the cladding optical filter of FIG. 1 including the cylindrical bore surrounding a cross-section of the optical fiber of FIG. 2A.
FIG. 4A is an end view of a square or rectangular form of the cladding optical filter of FIG. 1 including the cylindrical bore surrounding a cross-section of the optical fiber of FIG. 2B.
FIG. 4B is an end view of a square or rectangular form of the cladding optical filter of FIG. 1, formed by joining together two elongated half-square capillary tubes, including the cylindrical bore surrounding a cross-section of the optical fiber of FIG. 2A.

Various non-limiting examples will now be described with reference to the accompanying figures where like reference numbers correspond to like or functionally equivalent elements.

For purposes of the description hereinafter, terms like "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the disclosure. Hence, the specific examples or aspects disclosed herein are not to be construed as limiting.

With reference to FIG. 1, one non-limiting embodiment or example optical fiber cladding optical filter 2 in accordance the principles of this disclosure comprises an elongated optical fiber 4 a section of which is surrounded by an elongated capillary tube 6 that may be several centimeters in length. The capillary tube 6 includes an inner surface 8 positioned surrounding the optical fiber 4 proximate or adjacent an exterior surface 12 of the optical fiber and an outer surface 10 positioned spaced from the exterior surface 12 of the optical fiber. In an example, each capillary tube described herein may be formed of quartz.

A grating or grating pattern 14 (shown by dashed lines) is formed on the outer surface 10 of the capillary tube 6. In an example, the grating 14 may be formed only on a portion of the outer surface 10 of the capillary tube 6. In another example, the grating 14 may be formed on all or the entirety of the outer surface 10 of the capillary tube 6.

Figure 6:
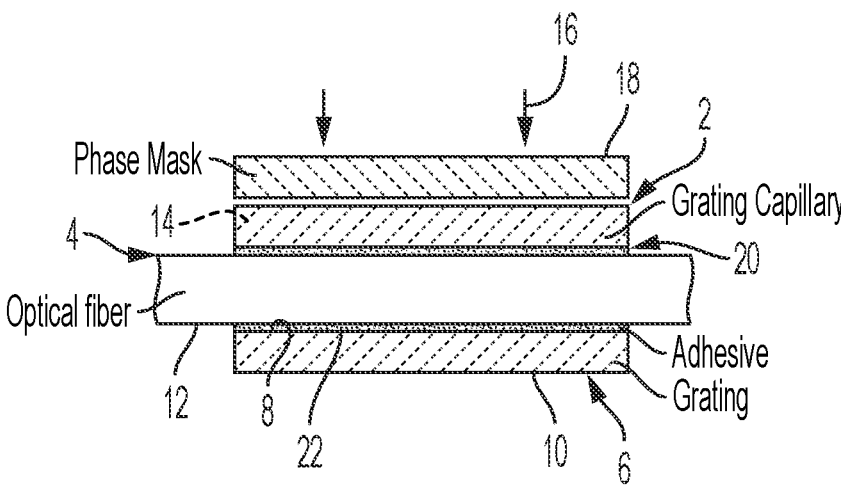
FIG. 6 is the length of the optical fiber and the section of the capillary tube of FIG. 1 further including a phase mask and rays of laser light used to form the grating pattern on an outer surface of the capillary tube.

In an example shown in FIG. 6, the grating 14 may be formed on the outer surface 10 of the capillary tube 6 by projecting laser light 16 onto the outer surface 10 of the capillary tube 6 via a phase mask 18, whereupon the laser light 16 impinging on the outer surface 10 of the capillary tube 6 etches the grating or grating pattern 14 onto the outer surface 10 of the capillary tube 6 The use of laser light 16 to form the grating on the outer surface 10 of the capillary tube 6 is not to be construed as limiting since it is envisioned that any other suitable and/or desirable means (e.g., mechanical etching), now known or hereinafter developed, may be used to form the grating or grating pattern 14.

In an example, the grating 14 may formed on the outer surface 10 of the capillary tube 6 prior to the elongated optical fiber 4 being received in the elongated opening 20 of the capillary tube 6 defined by the inner surface 8 of the capillary tube 6. However, this is not to be construed as limiting since it is envisioned that the grating 14 may formed on the outer surface 10 of the capillary tube 6 after the elongated optical fiber 4 is received in the elongated opening 20 of the capillary tube 6.

In an example, the grating 14 may be formed by projecting the laser light 16 via the stationary phase mask 18 onto the outer surface 10 of the capillary tube 6 while rotating the capillary tube 6 about its longitudinal axis. In another example, the grating 14 may be formed by rotating the laser light 16 and phase mask 18 around the outer surface 10 of the capillary tube 6 which, in this example, is held stationary.

In an example, an adhesive 22 may be disposed between the exterior surface 12 of the optical fiber 4 and the inner surface 8 of the capillary tube 6. In an example, refractive indices of the adhesive 22 and an optical fiber core 24 of the optical fiber may match.

With reference to FIGS. 2A and 2B, and with continuing reference to FIG. 1, the optical fiber 4 includes the optical fiber core 24 which is surrounded by at least a first, inner cladding or coating 26 which, in-turn, may be optionally surrounded by a second, outer cladding or coating 28. Where the optical fiber 4 includes the optional outer cladding or coating 28, the exterior surface 12 of the optical fiber 4 is the exterior surface of the outer cladding or coating 28. Where the optical fiber 4 includes only the inner cladding or coating 26, but not the optional outer cladding or coating 28, the exterior surface 12 of the optical fiber 4 is the exterior surface of the inner cladding or coating 26. In an example, the inner cladding or coating 26 may be formed of a polymer and the outer cladding or coating 28, when present, may be formed of an acrylate.

With reference to FIGS. 3A and 3B, in an example, capillary tubes 6 in accordance with the principles of this disclosure may be formed as a single, unitary piece (FIG. 3B) or may be formed from plurality of elongated partial capillary tubes 30 (FIG. 3A) joined together to form the capillary tube 6. In an example, the plurality of partial capillary tubes 30 may include two half capillary tubes 30 joined together to form the capillary tube 6. However, this is not to be construed as limiting since it is envisioned that any number of partial capillary tubes 30 may be joined together to form the capillary tube 6.

The illustration in FIG. 3A of the capillary tube 6 formed by the two half capillary tubes 30 surrounding the optical fiber 4 of FIG. 2B (which does not include the outer cladding or coating 28) is not to be construed as limiting since it is envisioned that the two half capillary tubes 30 of FIG. 3A may surround the optical fiber 4 of FIG. 2A (which includes the outer cladding or coating 28). Similarly, the illustration in FIG. 3B of the unitary piece capillary tube 6 surrounding the optical fiber 4 of FIG. 2A (which includes the outer cladding or coating 28) is not to be construed as limiting since it is envisioned that the unitary piece capillary tube 6 of FIG. 3B may surround the optical fiber 4 of FIG. 2B (which does not include the outer cladding or coating 28).

The plurality of elongated partial capillary tubes 30 (FIG. 3A) joined together to form the capillary tube 6 may be joined together mechanically or with an adhesive. In an example where an adhesive is used to join together the plurality of elongated partial capillary tubes 30, the adhesive may be the same adhesive 22 that is disposed between the exterior surface 12 of the optical fiber 4 and the inner surface 8 of the capillary tube 6 or may be a different adhesive. In an example, refractive indices of the adhesive used to join together the plurality of elongated partial capillary tubes 30 and the optical fiber core 24 of the optical fiber may match.

With reference to FIGS. 4A and 4B, in an example, capillary tubes 6 in accordance the principles of this disclosure may be formed as a single, unitary piece (FIG. 4A) having a square or rectangular exterior surface 10 or may be formed from plurality of elongated partial capillary tubes 30 (FIG. 4B) joined together to form the capillary tube 6 having a square or rectangular exterior surface 10. Other than the exterior surfaces 10 of the example capillary tubes 6 shown in FIGS. 4A and 4B being square or rectangular, versus the exterior surfaces 10 of the example capillary tubes 6 shown in FIGS. 3A and 3B being circular or round, the capillary tubes 6 shown in FIGS. 3A-3B and 4A-4B are otherwise the same.

The illustration in FIG. 4A of the unitary piece capillary tube 6 having a square or rectangular exterior surface 10 surrounding the optical fiber 4 of FIG. 2B (which does not include the outer cladding or coating 28) is not to be construed as limiting since it is envisioned that the unitary piece capillary tube 6 of FIG. 4A having a square or rectangular exterior surface 10 may surround the optical fiber 4 of FIG. 2A (which includes the outer cladding or coating 28). Similarly, the illustration in FIG. 4B of the capillary tube 6 formed by two partial capillary tubes 30 surrounding the optical fiber 4 of FIG. 2A (which includes the outer cladding or coating 28) is not to be construed as limiting since it is envisioned that the two partial capillary tubes 30 of FIG. 4B may surround the optical fiber of FIG. 2B (which does not include the outer cladding or coating 28).

Figure 5:
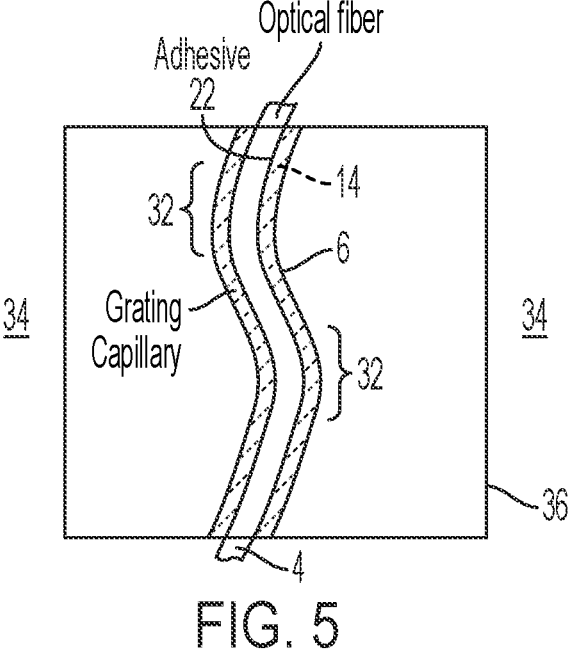
FIG. 5 is the length of the optical fiber and the section of the capillary tube of FIG. 1, including curves formed along said length, disposed within an enclosure.

With reference to FIG. 5 and with continuing reference to all previous figures, in an example, any embodiment or example capillary tube 6 described herein that includes an optical fiber 4 disposed in or enclosed in the opening 20 of the capillary tube 6 may be formed or shaped to include one or more curves or bends 32 along a length or section of the capillary tube 6 and enclosed optical fiber 4. The one or more curves or bends 32 may aid in the partial or total removal of one or more higher order modes of laser light propagating in the fiber core 24 of the optical fiber 6. More specifically, the one or more higher order modes of laser light propagating through the fiber core 24 in the area of the one or more curves or bends 32 may exit the inner cladding or coating 26 of the optical fiber 4 and, when present, may exit the outer cladding or coating 28 of the optical fiber 4 as evanescent laser light.

To avoid the evanescent laser light exiting the inner cladding or coating 26 and, when present, the outer cladding or coating 28 of the optical fiber 4 from undesirably propagating into the ambient environment 34, at least the one or more curves or bends 32 may be received or disposed in a whole (sealed) or partial container 36. In an example, the container 36 may be formed of aluminum. However, this is not to be construed in a limiting sense since the container 36 may be formed of any suitable and/or desirable material that fully or partially blocks the evanescent laser light exiting the optical fiber 4 from propagation of into the ambient environment 34.

In use of any embodiment or example capillary tube 6 described herein, laser light is propagated through the optical fiber 4, in particular the optical fiber core 24, whereupon evanescent laser light exiting transverse to a longitudinal axis of the optical fiber 4, i.e., either the inner cladding or coating 26 and, when present, the outer cladding or coating 28 of the optical fiber 4, in the area of the capillary tube 6 is suppressed by the grating 14 of the capillary tube 6. In an example, when the optical fiber 4 includes one or more curves or bends 32, said one or more curves or bends 32 may aid in the partial or total removal of one or more higher order modes of laser light propagating in the fiber core 24 of the optical fiber 6.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. An optical fiber cladding optical filter comprising:
   an elongated optical fiber;
   an elongated capillary tube including an inner surface positioned surrounding the optical fiber proximate or adjacent an exterior surface of the optical fiber and an outer surface positioned spaced from the exterior surface of the optical fiber;
   a grating formed on the elongated capillary tube; and
   an adhesive disposed between the exterior surface of the optical fiber and the inner surface of the elongated capillary tube.

2. The optical fiber cladding optical filter of claim 1, whereon the grating is formed on at least a portion of the outer surface of the elongated capillary tube.

3. The optical fiber cladding optical filter of claim 2, wherein the grating is formed on the at least a portion of the outer surface of the elongated capillary tube by projecting a laser light onto the at least a portion of the outer surface of the elongated capillary tube via a phase mask.

4. The optical fiber cladding optical filter of claim 1, wherein refractive indices of the adhesive and a core of the optical fiber match.

5. An optical fiber cladding optical filter comprising:

an elongated optical fiber;

an elongated capillary tube including an inner surface positioned surrounding the optical fiber proximate or adjacent an exterior surface of the optical fiber and an outer surface positioned spaced from the exterior surface of the optical fiber; and a grating formed on the elongated capillary tube, wherein the elongated capillary tube is formed of quartz.

6. The optical fiber cladding optical filter of claim 1, wherein the grating surrounds at least portion of the outer surface of the elongated capillary tube.

7. The optical fiber cladding optical filter of claim 1, wherein the optical fiber includes an optical fiber core which is surrounded by a cladding which is surrounded by a coating which defines the outer surface of the elongated optical fiber.

8. The optical fiber cladding optical filter of claim 1, wherein the optical fiber includes an optical fiber core which is surrounded by a cladding which defines the outer surface of the elongated optical fiber.

9. An optical fiber cladding optical filter comprising:

an elongated optical fiber;

an elongated capillary tube including an inner surface positioned surrounding the optical fiber proximate or adjacent an exterior surface of the optical fiber and an outer surface positioned spaced from the exterior surface of the optical fiber; and a grating formed on the elongated capillary tube, wherein the elongated capillary tube is formed from a plurality of elongated partial capillary tubes joined together to form the elongated capillary tube.

10. The optical fiber cladding optical filter of claim 9, wherein the plurality of elongated partial capillary tubes consists of two half capillary tubes joined together to form the elongated capillary tube.

11. The optical fiber cladding optical filter of claim 9, further including an adhesive:

joining the plurality of elongated partial capillary tubes together; or disposed between the exterior surface of the optical fiber and the inner surface of the elongated capillary tube; or both.

12. The optical fiber cladding optical filter of claim 11, wherein refractive indices of the adhesive and a core of the optical fiber match.

13. The optical fiber cladding optical filter of claim 1, wherein the elongated optical fiber and surrounding elongated capillary tube include one or more curves along a length thereof.

14. The optical fiber cladding optical filter of claim 13, further including the one or more curves disposed in a container.

15. The optical fiber cladding optical filter of claim 14, wherein the container is formed of aluminum.

16. A method of optical fiber cladding optical filtering comprising:

(a) providing the optical fiber cladding optical filter of claim 1; and (b) propagating light through the optical fiber, whereupon the grating suppresses light exiting the optical fiber transverse to a longitudinal axis of the optical fiber.

17. The method of claim 16, wherein:

the light is laser light; and the light that exits the optical fiber transverse to a longitudinal axis of the optical fiber is evanescent laser light.

18. The method of claim 16, wherein the optical fiber cladding optical filter of includes one or more curves formed along a length of the elongated optical fiber surrounded by the elongated capillary tube.

19. The method of claim 18, wherein:

the light is laser light; and the light that exits the optical fiber transverse to a longitudinal axis of the optical fiber along the one or more curves is evanescent laser light.

* * * * *